United States Patent
He et al.

(10) Patent No.: US 7,346,240 B1
(45) Date of Patent: Mar. 18, 2008

(54) INTEGRATED FIBER TAP MONITOR WITH VARIABLE OPTICAL ATTENUATOR

(75) Inventors: Yi He, Carlsbad, CA (US); Jian Li, Carlsbad, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 0 days.

(21) Appl. No.: 10/726,026

(22) Filed: Dec. 1, 2003

Related U.S. Application Data (60) Provisional application No. 60/439,077, filed on Jan. 8, 2003.

(51) Int. Cl.
  *G02B 6/26* (2006.01)
  *G02B 6/42* (2006.01)
(52) U.S. Cl. ........................................................ 385/48
(58) Field of Classification Search ................... 385/48
  See application file for complete search history.

(56) References Cited

U.S. PATENT DOCUMENTS

| | | | | |
|---|---|---|---|---|
| 5,917,643 | A * | 6/1999 | Watanabe et al. | 359/281 |
| 6,647,173 | B2 * | 11/2003 | Chen et al. | 385/18 |
| 2002/0031324 | A1 * | 3/2002 | Cao et al. | 385/140 |
| 2003/0081901 | A1 * | 5/2003 | Gage et al. | 385/48 |
| 2003/0156815 | A1 | 8/2003 | He | |
| 2003/0156816 | A1 | 8/2003 | He | |
| 2003/0156817 | A1 | 8/2003 | He | |

* cited by examiner

*Primary Examiner*—Frank G. Font
*Assistant Examiner*—Erin D Chiem
(74) *Attorney, Agent, or Firm*—File-EE-Patents.com; Jay A. Chesavage

(57) ABSTRACT

Integrated fiber tap monitors with variable optical attenuators where light from an input fiber is reflected to the output fiber and a tap is generated from measuring transmission at the reflection.

13 Claims, 5 Drawing Sheets

Figure 5
TVOA Core

*Figure 6A*
VOA side view

*Figure 6B*
View B-B end facet

*Figure 6C*

INTEGRATED FIBER TAP MONITOR WITH VARIABLE OPTICAL ATTENUATOR

CROSS-REFERENCE TO RELATED APPLICATIONS

This application claims the benefit of U.S. Provisional Application No. 60/439,077 entitled "A Tap with Variable Optical Attenuator" and filed Jan. 8, 2003, the disclosure of which is incorporated herein by reference.

BACKGROUND

This application relates to fiber devices, and more particularly, to fiber tap monitors and fiber power control devices in fiber devices or systems such as fiber communication systems.

Optical monitoring of one or more optical signals is desirable in many applications. In general, a fraction of an optical signal is sampled by using a power splitter or tap as a monitor beam and is directed into an optical detector to determine the power level and other information of the signal. The monitor beam may be only a small fraction of the signal so that the sampling does not significantly affect the power level of the signal. Such optical monitoring may be implemented in fiber communication networks to monitor optical signals at selected locations.

In addition, a power level of an optical signal may need to be reduced to meet certain operational requirements. For example, in fiber communication systems, it may be desirable to maintain the power levels of different WDM channels at the about the same power level. If a channel is found to be higher than the desired channel power beyond a tolerance level, the power of that channel may be attenuated. This attenuation may be achieved by using a variable optical attenuator (VOA) to provide a variable power attenuation according to the amount of deviation beyond the tolerance level. As another example, an optical signal may be attenuated to keep the signal power within a detection dynamic range of an optical detector.

Therefore, there is a need for devices that combine optical monitoring and optical attenuation.

SUMMARY

This application includes implementations of integrated optical taps with variable optical attenuators. The devices described here may include an input fiber to receive optical input and an output fiber to export optical output for applications in fiber systems.

In one implementation, such a device includes reflector with a reflective surface that is partially transmissive to light. The reflector is positioned to reflect a part of the input optical beam as a reflected optical beam into the output fiber and to transmit a part of the input optical beam as a transmitted optical beam to be monitored. An optical detector is used to receive the transmitted optical beam and to produce a detector output. The device further includes a variable optical attenuator positioned in an optical path between the reflective surface and one of the input and the output fibers to attenuate light in response to a control signal. The variable optical attenuator may attenuate light by scattering light, by reflecting light, or by absorbing light. The position of the variable optical attenuator may be either in the input optical path for monitoring the output power or in the output optical path for monitoring the input power.

In another implementation, a fiber device includes a housing having a first end and a second opposing end to hold an optical detector engaged to the first end, a collimator lens having a flat end lens facet to face the optical detector and to transmit a fraction of light to the optical detector, a magnet to produce a magnetic field, and a capillary body to hold input and output fibers that exit the housing at the second opposing end. The capillary body has an end facet facing the collimator lens to expose end facets of the input and output fibers to the collimator lens and to the magnetic field. The collimator is configured and spaced from the end facet of the capillary body to collimate light from one fiber and to focus reflected light by the flat end lens facet to another fiber. This device further includes a conductive wire movably fixed to the capillary body to have a wire portion across the end fact of the capillary body. The wire is movable along this end facet when an electric current is supplied to the wire to interact with the magnetic field. Furthermore, a shutter is engaged to the wire portion and thus is movable along with the wire to intercept a beam that is either output by the input fiber or received by the output fiber to attenuate the beam.

These and other implementations and associated methods are described in greater detail with reference to the drawings, the detailed description, and the claims.

BRIEF DESCRIPTION OF THE DRAWINGS

FIG. 3 shows one example of a variable optical attenuator suitable for devices in FIGS. 1-3.

DETAILED DESCRIPTION

Figure 1:
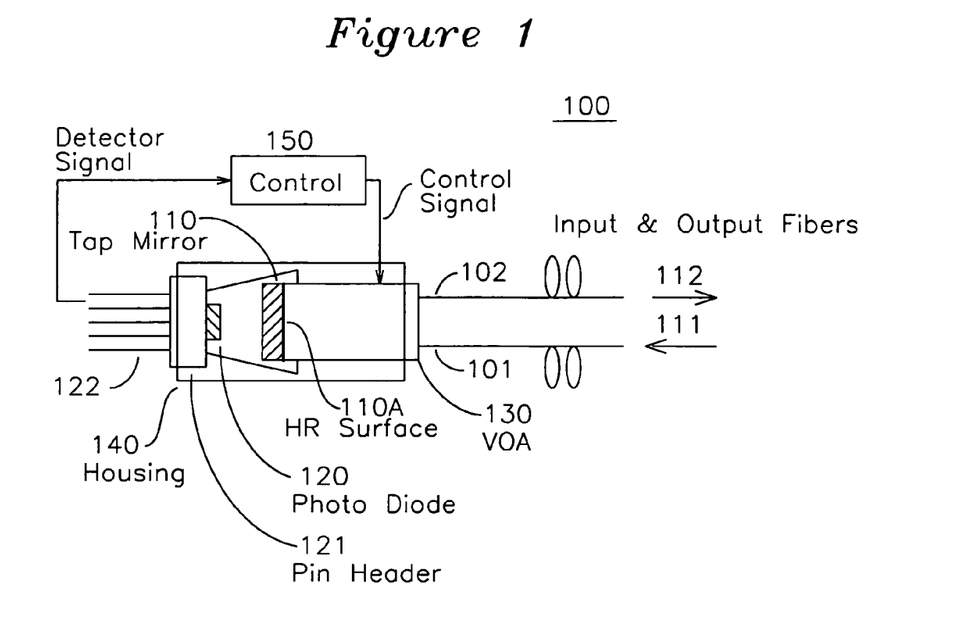
FIG. 1 shows one exemplary implementation of an integrated optical tap with a variable optical attenuator.
Figure 2:
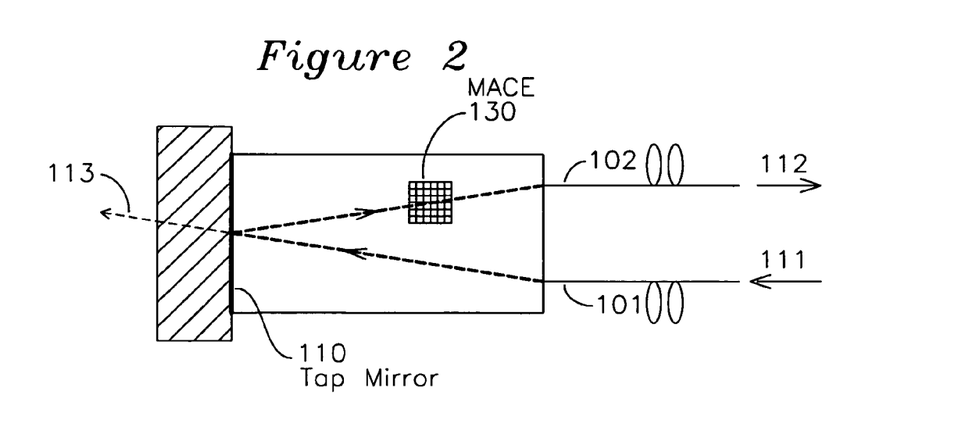
FIGS. 2 and 3 shows two exemplary configurations of the device shown in FIG. 1.
Figure 3:
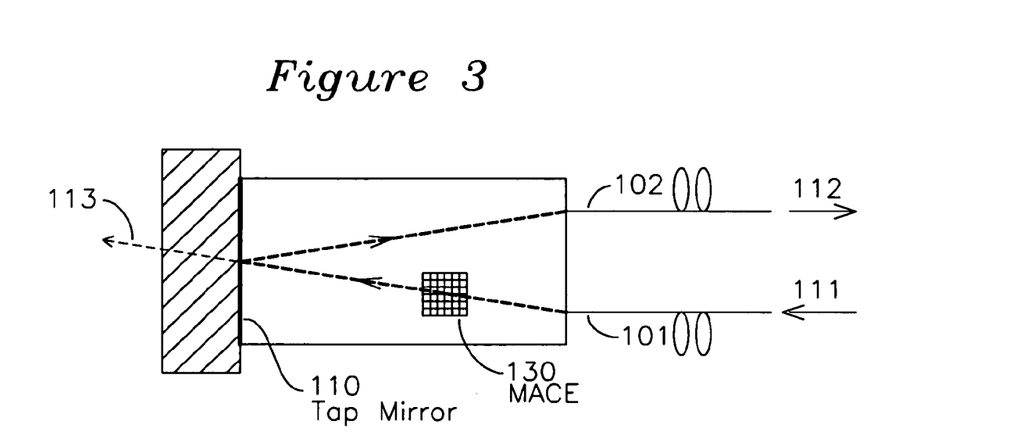

The devices described here use a partially transmissive optical reflector to reflect an input optical signal and to produce the monitor beam by a small optical transmission of the reflector. FIG. 1 show one exemplary implementation 100 where a device housing 140 is used to enclose and hold an optical detector 120, a tap mirror 110, a VOA 130, and the input and output fibers 101 and 102. FIGS. 2 and 3 show two different positions of the VOA 103. This integration within the housing 140 allows the entire device to be compact, and to provide both optical monitoring and attenuation in one package.

As illustrated, the input fiber 101 receives an input beam 111 and is positioned relative to the reflector 110 to direct the input beam 111 to the reflective surface 110A of reflector 110. The reflection at the reflective surface 110A is the reflected output beam 112. The output fiber 102 is positioned to receive and guide the reflected output beam 112. The reflective surface 110A is partially transmissive to produce a transmitted beam 113 as the monitor beam. This reflection configuration allows for a simple geometry to optically couple the input and output fibers 101 and 102 to each other to continue the majority of the input beam 111 as the output beam while splitting a small fraction to produce the monitor beam 113.

A number of advantages can be readily achieved from this reflection configuration. For example, this reflection configuration essentially "folds" the optical path to allow the input and output fibers to be placed next to each other in parallel and located on the same side. This folding reduces the physical dimension and makes the device compact. Also, this design avoids complex fiber to fiber coupling schemes that generally introduce additional optical loss and increase the device cost. This is in part because each component has its insertion loss (IL), polarization-dependent loss (PDL), wavelength-dependent loss (WDL), and reflection loss (RL), and the optical specifications are decided by the combination of these components. Hence, it is generally difficult to balance or even to realize good optical specifications of the module. In addition, this design does not require any bending of the input and output fibers and thus avoids optical bending-induced optical losses and bending-related limitation on the device dimension. Due to this and other features of this design, devices based on FIG. 1 can realize compact device packaging, predefined optical specifications, good dynamic performance, and low cost.

In the device 100, the optical detector 120 such as a photodiode is positioned at the back of the reflector 110 to receive and convert the transmitted beam 113 into a detector signal. A controller 150 is provided to receive the detector signal and processes it to determine the power level of either the input signal 111 or the output beam 112. Certainly, other information may also be extracted from the detector signal. The controller 150 generates a control signal based on the measured power level to adjust VOA 130. As the measured power level varies, the VOA 130 is adjusted accordingly to change the optical attenuation. The VOA 130 may be implemented in various configurations. On example is a Micro Attenuation Controllable Element (MACE) which provides accurate and repeatable optical attenuations in a compact package. The MACE may be configured to attenuate the optical power in a number of ways such as scattering, reflecting, or absorbing.

FIG. 2 shows that the VOA 130 is inserted into the output light path to attenuate the light power, e.g., between the reflector 110 and the receiving end facet of the output fiber 102. The transmitted light 113 is used for monitoring the light power level of the input beam 111 upon proper measurement calibration. This is an input tap with a VOA because the VOA 103 does not affect the measurement of the detector 120 on the input power.

FIG. 3 shows an exemplary output monitoring tap with a VOA where the VOA 130 is inserted into the light path of the input beam 111 to attenuate the light power, e.g., between the reflector 110 and the output end facet of the input fiber 101. The transmitted light is used for monitoring the power level of the output beam 112 upon proper calibration.

Referring back to FIG. 1, the housing 140 may generally have a tubular body with two opposing terminals. The body of the housing 140 encloses the VOA 130, the detector 120 and the end facts of the fibers 101 and 102. One terminal may have a fixture to hold the fibers 101 and 102 in place and the other terminal may have a port to hold the support mount (e.g., the pin header) of the detector 120 that has the electrodes connected the detector 120 and the controller 150. In one implementation, the electrodes of the VOA 130 and the photo diode 120 may be soldered to the pin header. A ground pin is also soldered to the header. Hence, all the parts can be integrated into the housing 140 with, e.g., input/output fibers 101 and 102 on one side and the electrical connections on the other.

Figure 4:
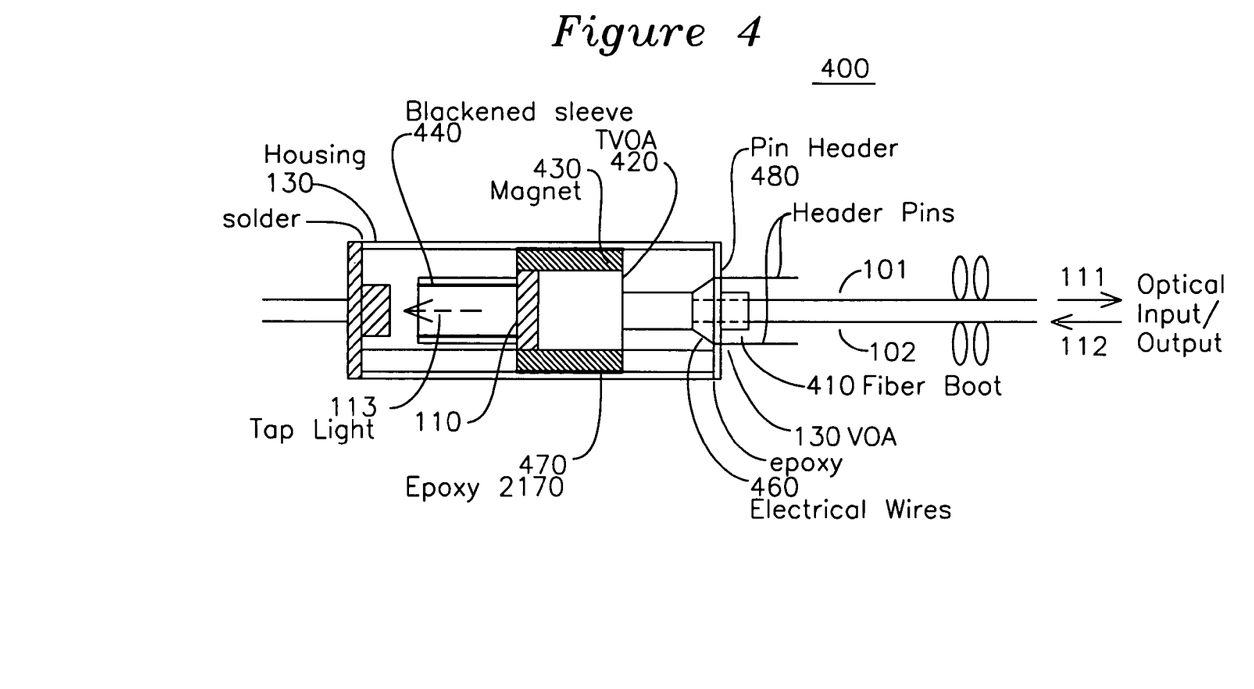
FIG. 4 shows an exemplary device as a fiber tag with a VOA (TVOA) based on the design in FIG. 1.

FIG. 4 shows an exemplary device 400 as a fiber tag with a VOA (TVOA) based on the design in FIG. 1. This particular TVOA 400 has a TO-canned photo detector 450, a TVOA core 420, a housing 130, a two-pin header 480, and a fiber boot or capillary body 410 that holds the input and output fibers 101 and 102. The components 450, 420, 480 and 410 are engaged to the housing 130 as integrated package by, e.g., using soldering or epoxies. The TVOA core 420 is an integrated module that has both the VOA and the tap mirror. A sleeve 440 with blackened inner surfaces may be engaged to the tap mirror side of the core 420 to provide optical shield for the detector 450 against the scattered light. The light 113 transmitted through the tap mirror is captured by the detector 450 and then is converted to a photo current as the TVOA tap. The tap has a relation with the input light power or output light power. Hence, by monitoring the tap (photo current), input light power or output light power can be inferred. As shown in FIGS. 2 and 3, the TVOA 400 may be operated as either an input type TVOA or an output type TVOA. In the input type TVOA mode, the internal VOA attenuates the output beam reflected from the tap mirror while the input beam is not perturbed by the VOA. Hence, the tap functions as input light power monitor. In an output type TVOA, the internal VOA attenuates the input beam while the output beam is not perturbed by the VOA. Therefore, the tap functions as output light power monitor.

The following sections describe exemplary features of the components of the TVOA 400.

In certain applications such as fiber networks, it may be desirable to seal off the TVOA Package so that the outside moisture is essentially blocked because the operation and performance of the TVOA may be degraded or adversely affected by intrusion of the moisture. In the illustrated implementation, the TVOA package design may not be hermetically sealed while the detector may be hermetically sealed. The unique design of the TVOA core 420 allows the packaged TVOA to have outstanding reliability performance, including with damp-resistant and heat-resistant performance in full compliance with the Telcordia requirements, such as GR-1209, GR-1221 & GR-468, etc. Hence, easy manufacturing, low cost, high performance and high reliability will be achieved at the same time. Alternatively, each component may be hermetically sealed.

For fiber network applications, the detector 450 should be qualified under the Telcordia GR-468. Generally, a TO-canned package design is commercially available in the industry. The active area of the detector is selected to be about 500 μm in diameter to capture max light output from the TVOA tag mirror. A larger active area may give better PDR and more convenient alignment between the detector and TVOA core. The distance between the detector and the TVOA core GRIN lens output surface is an important parameter to the tap performance; especially in the case of output type TVOA. This distance can be less than about 2.0 mm for input type TVOA. For output type TVOA, this distance is better to be more than 10.0 mm to have better PDR. The detector 450 may be attached to the housing 130 by, e.g., soldering or using an adhesive such as epoxy. In one implementation, a low temperature flux-cleaned solder material may be used to attach a photodiode as the detector 450 to the housing 130 to avoid overheating and reduce the high dark current.

In operation, the TVOA core 420 may cause some light to scatter, especially in higher attenuation operation when a transparent or reflective shutter is used in the TVOA core, such light scatter may be prominent. Scattered light captured by the detector 450 can degrade the tap performance, such as PDR. To reduce the scattered light captured by the detector 450, a number of techniques may be used. For example, the inner surface of the housing may be blackened, e.g., the sleeve 440 with blackened inner surfaces. As another example, a pin-hole may be positioned in the optical path between the detector 450 and the TVOA core 420 to block part of the scattered light. In the example shown in FIG. 4, a blackened sleeve 440 is attached to the housing inner surface to absorb the scattered light.

The housing 130 may be made of various materials. For example, the commercial stainless steel "S.S. 303" may be used. The housing 130 may be separated into a first part for holding the detector 450 and TVOA core 420 and a second part attached to the first part by bonding with an adhesive (e.g., epoxy 2170 from Tra-Con, Inc., or equivalent). The first part is gold-plated for convenience of soldering. There is an angle between the center axis of the inner housing hole to hold the detector and the center axis of the inner housing hole to hold the detector. This angle is determined by the light output angle from the GRIN lens output surface. The angle for the current design is 2.5 degree. With this angle, it will be convenient to align the detector and TVOA core actively.

The TVOA core 420 includes a VOA module having a movable shutter carried by a current-carrying conductive wire. A permanent magnet module 430 is provided to produce a static magnetic field that is approximately along the beams 111 and 112 to move the shutter in one of the beams 111 and 112 and thus to cause attenuation. The current in the wire is controlled to adjust the position of the conductive wire in the attenuated beam so that different degrees of attenuation can be achieved. The permanent magnet module 430 may include a permanent magnet ring whose outer exterior surface is bonded to the inner surface of the housing 130 by, e.g., using a suitable adhesive such as epoxy or soldering. For example, the epoxy 2170 from Tra-Con, Inc. may be used for bonding. The conductive wire that holds, the moving shutter is connected two electrical wires 460 for connecting to a current source that drives the shutter. This current source is controlled by and may be integrated as part of the control 150 in FIG. 1. These two wires 460 are connected to the two pins of the two-pin header 480 by soldering. The two-pin header 480 may be attached to the housing 130 by bonding with an adhesive such as epoxy. As illustrated, an adapter may be sandwiched between the opening of the housing 130 and the two-pin header 480 to facilitate the engagement between the header 480 and the housing 130.

The device 400 in FIG. 4 uses fiber loose tubes to protect the fibers from over-bending or damage. They are attached with 5 min. epoxy or equivalent to a fiber boot, which is bonded to the 2-pin header with 5 min. epoxy or its equivalent as well. Fibers are free inside the loose tubes without any bonding between the fiber coating and loose tubes. A rubber boot is added through the loose tubes and over the fiber boot to improve the protection from side pulling or over-bending.

Figure 5:
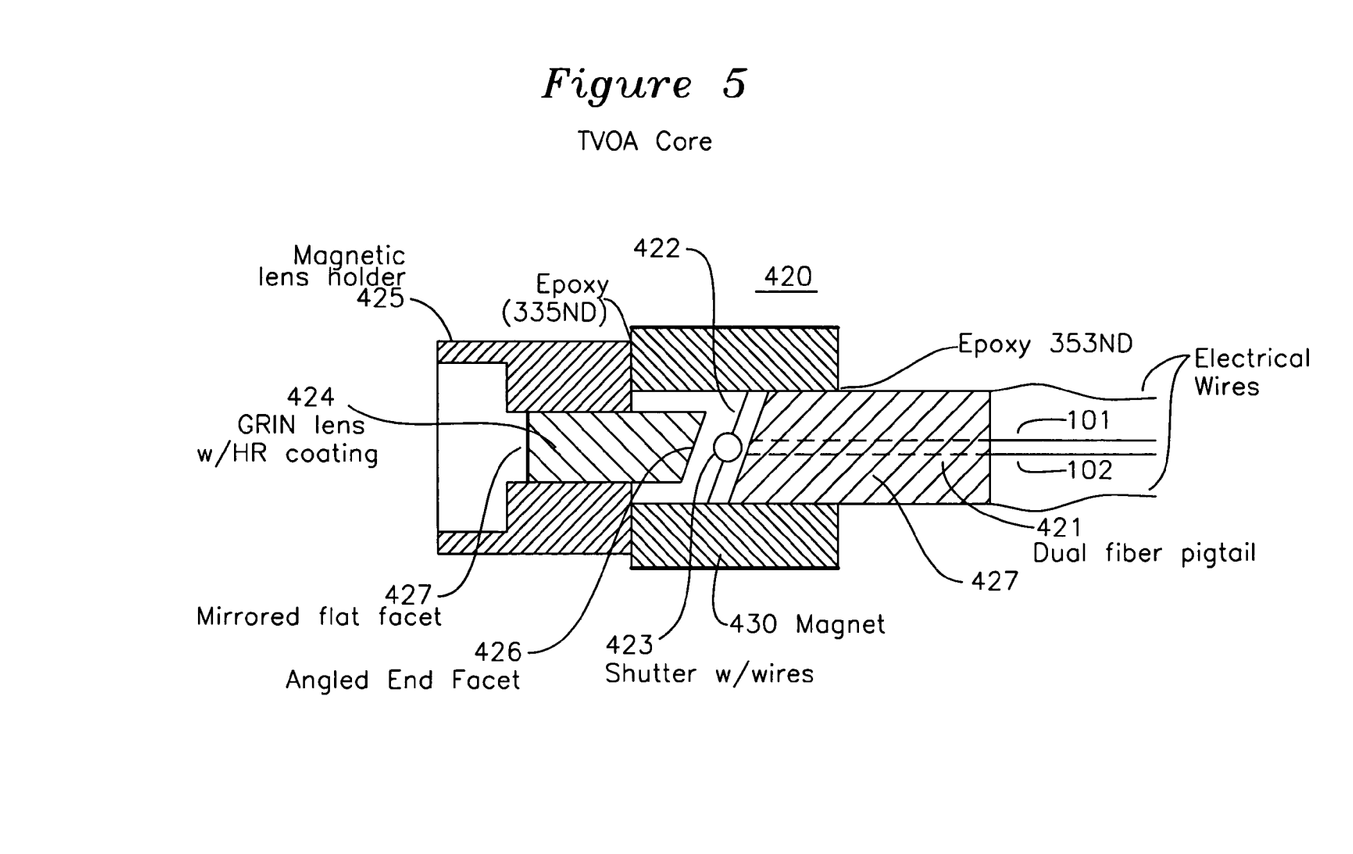
FIG. 5 shows additional details of the TVOA core in FIG. 4.

FIG. 5 shows additional details of the TVOA core 420 in FIG. 4. The core 420 has a lens holder 425 to hold a GRIN lens 424 with an angled end facet 426 facing the fibers 101 and 102 and a second opposing flat end facet 427 as the tap mirror. The end facet 427 has a high reflective coating or is attached to a partially transmissive reflector to produce desired reflectivity for producing the output beam 112 and the transmission for producing the transmitted beam 113. The input and output fibers 101 and 102 are held by a capillary body 421 to form a dual fiber pigtail. The capillary body 421 has an angled facet 422 that exposes the end facets of the fibers 101 and 102 to the reflect. A movable shutter 423 is held on the end facet 422 and is engaged to a conductive wire that carries the variable driving current. Alternatively, the shutter 423 may be spaced away from the end facet 422 without direct contact. The Lorentz force on the conductive wire exerted by the permanent magnetic field from the magnet 430 moves the wire and thus the shutter 423 along the facet 422. The facet 422 of the capillary body 421 is spaced from the end facet 426 of the GRIN lens 424 to allow for free movement of the shutter 423. As illustrated, the facet 422 may be parallel to the end facet 426 of the GRIN lens 424.

The GRIN lens 424 collimates the light beam 111 from the input fiber 101 and focuses the reflected beam 112 to the output fiber 102. This design of the TVOA core 420 effectuates a dual fiber collimator. Hence, a commercial dual fiber collimator may be modified to implement this design so that the VOA and Tap functions are integrated together in the same collimator. As an example, the GRIN lens 424 may be from about 1 mm to about 1.8 mm in diameter and 0.22-0.23 pitch. Alternatively, the GRIN lens 424 may be replaced by a C-lens.

The function of a tap mirror is to provide a few percentage of light from the input to be monitored or detected. The rest will be reflected back to the dual fiber pigtail output. The tap mirror may be a bulk mirror with multi-layer dialectic material coated on a glass surface and may be attached to the GRIN lens flat end with different ways, such as epoxies, laser wielding or soldering through metal holders. Alternatively, the tap mirror may be formed by a reflective coating on the GRIN lens flat end. This approach may be convenient for assembly process and may allow for high reliability of the final devices.

The GRIN lens 424 may be engaged to the rest of the TVOA core 420 in a number of ways. For example, for lens with the same or close diameter as the pigtail 421, a tube made with glass or metal can be used. The bonding between the two parts to the tube can be achieved with epoxy, or soldering or laser wielding. The optical alignment for this approach may be the adjustment of the relative longitudinal position between the two parts and the skewed angle of a bulk mirror to the lens flat end surface. Direct coated mirror may be used in this approach but the tube may need to break into two parts and re-join them after the alignment. Transverse alignment between the lens and the pigtail need to be performed instead of bulk mirror skewed angle alignment.

In the example where a 1 mm GRIN lens with direct-coated mirror is used, a magnetic metal lens holder 425, such as Kovar (Ni-plated), may be used to hold the GRIN lens 424 and a magnetic ring 430 may be used as a holder for the pigtail 421. In this design, the magnetic ring 430 also produces the desired magnetic field for driving the shutter 423. The magnetic metal lens holder 425 can automatically stick to the end surface of the magnet ring 430 when they are attached together. A suitable adhesive material, such as the commercial 353ND epoxy or equivalent, may be used to strengthen the bonding between them. This design can prevent their relative movement any time in applications in different environment and thus allows for easy alignment and high reliability of the device. High reliability of this approach were demonstrated in 85/85DH tests. The adhesive material such as 353ND may also be used for the bonding between the pigtail and magnet ring, and for the bonding between the GRIN lens and lens holder as well.

The spacing between the facet 426 of the GRN lens 424 and the facet 422 of the capillary body 421 is set so that the shutter 423 is approximately at the front focal point of the GRIN lens 424 for effective attenuating operations by scattering, absorption, or reflection of light. The shutter 423 is engaged to a gold or other conductive wire to move with the wire under the Lorentz force. The movement is generated by magnetic force with a current going through the wire. Varied current will give varied force and hence the magnetic force is varied. The wire holding the shutter 423 is mounted to the capillary body 421 in a way to generate a tension and the shutter stopping position is dependant on the balance between the magnetic force applied on the wire and the tension of the wire. At different positions in an optical path of the light beam 111 or 112, the shutter 423 will absorb, reflect or scatter different levels of light either in the input fiber side or the output side. Hence, variable optical attenuation (VOA) is achieved.

Figure 6A:
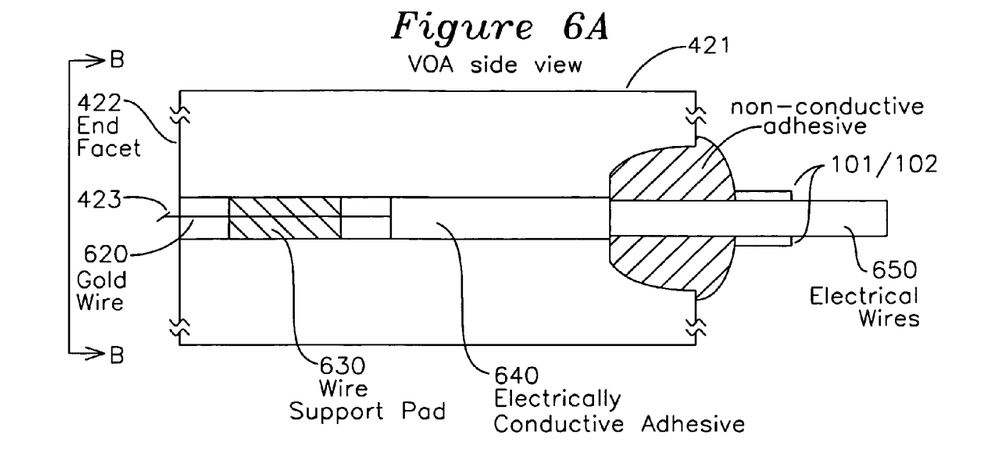
FIGS. 6A, 6B, and 6C further illustrate the details of the VOA part of the TVOA core in FIG. 4.
Figure 6B:
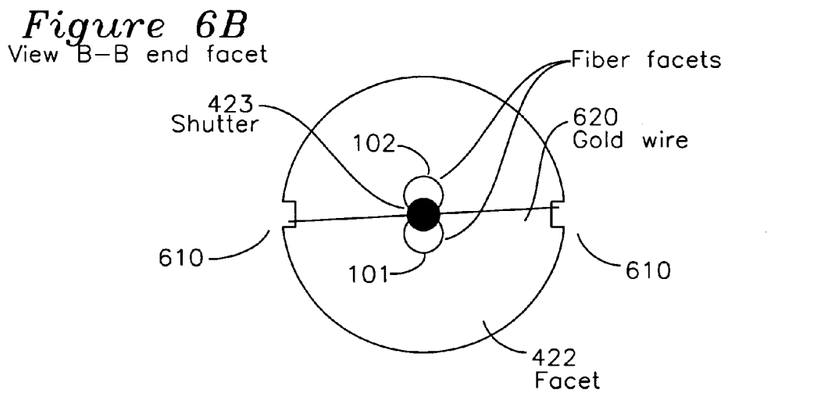
Figure 6C:
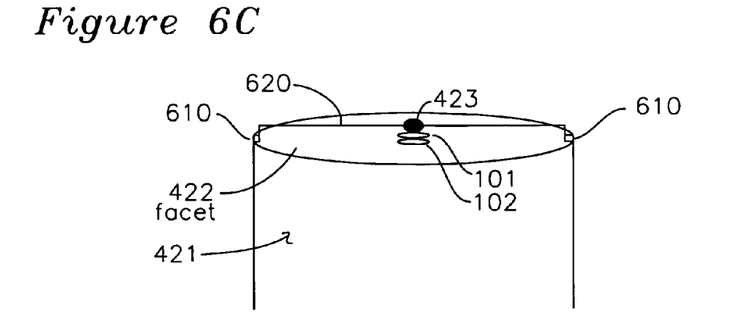

FIGS. 6A, 6B, and 6C further illustrate the details of the VOA part of the TVOA core 420. FIG. 6A shows a side view of the VOA. Two grooves 610 such as U grooves or other suitable shapes are symmetrically formed on two opposing sides of the capillary body 421 for placing the conductive wire 620 that holds and moves the shutter 423. The grooves 610 extend through the capillary body 421 to provide a path in the pigtail for electrical connection to the current source. The conductive wire 620 wraps around the end facet 422 of the capillary body and has two ends that are respectively fixed in the two grooves 610 by using a conductive adhesive 640. The portion of the wire 620 on the end facet 422 is used to hold the shutter 423 and interacts with the magnetic field to move the shutter 423. Two extended electrical wires 650 are electrically connected to the two ends of the conductive wire 620 by the same conductive adhesive 640 and are used to conduct the driving current from the current source that is controlled by the control 150 shown in FIG. 1.

Notably, a wire support pad 630 of an elastic and soft material is deposited in each of the two grooves 610 between the end facet 422 and the conductive adhesive 640 to fix and hold each side of conductive wire 620. The fixed points on the wire 620 on the two pads 630 are the pivot point for the motion of the wire 620. The elasticity and the softness of the pads 630 at the fixed points provide a damping mechanism to reduce effects of outside mechanical shocks or vibrations to the wire 620 and the shutter 423. In addition, a portion on each pad 630 is in direct contact with a part of the wire 620 that is not fixed to the pad 630 and provides an additional mechanical support to the contacted but movable part of the conductive wire 620 at all times. This contact of pads 630 with the movable part of the wire 620 is used as an additional damping mechanism to reduce effects of outside mechanical shocks or vibrations to the wire 620 and the shutter 423. Furthermore, the pads 630 provide a desired friction on the wire 620 when the wire 620 is in motion and operate as a buffer to modify the wire tension so that the movement and the position of the wire 620 can be controlled in a repeatable manner in response to the varying force on the wire 620 as the current is adjusted. The material for the pads 630 may be a foam-like material to provide the desired elastic property and the softness. For example, the commercial epoxy RTV 3140 from Dow-Corning or equivalent epoxy may be used to form the pads 630 to bond the gold wire 620 inside the U-grooves 610. Conductive epoxy, H20E from Epotek, or equivalent, may be used as the conductive adhesive 640 to bond the wire 620 (e.g., gold wire) and the extended electrical wires 650 (e.g., silver wires).

FIGS. 6B and 6C show the features of the exemplary TVOA core 420 in different views. FIG. 6B shows the cross sectional view of the end facet 422 of the capillary body 421 along the lines BB in FIG. 6A. The two fibers 101 and 102 are held in close proximity to each other by the capillary body 421. The shutter 423 fixed to the wire 620 may be positioned between the two fibers 101 and 102 at a given driving current in the wire 620. Assuming the direction of the magnetic field goes into the paper in FIG. 6B and the driving current in the wire 620 flows from the left hand side to the right hand side over the facet 422, the Lorentz fore on the wire will be directed towards the fiber 101. Under this condition, the shutter 423 will move toward the fiber 101 as the current increases to attenuate the input light 111.

Only a few implementations are described. However, it is understood that variations and enhancements may be made.

What is claimed is:

1. A device, comprising:
   an input fiber to guide an input optical beam;
   a stationary reflector having a reflective surface that is partially transmissive to light, said reflector positioned to reflect a part of the input optical beam at said reflective surface as a reflected optical beam and to transmit a part of the input optical beam as a transmitted optical beam;
   an output fiber adjacent to said input fiber, said output fiber positioned to receive and guide the reflected optical beam as an output optical beam;
   an optical detector positioned to receive the transmitted optical beam and to produce a detector output;
   a magnetic field substantially axial to said input of said output optical fiber;
   a variable optical attenuator positioned in an optical path between said reflective surface and one of said input and said output fibers to attenuate light in response to a control signal;
   said variable optical attenuator comprising a movable shutter placed between said input or said output fiber and said stationary reflector, said movable shutter interacting with said optical beam, said movable shutter supported by a current carrying wire;
   said variable optical attenuator having a maximum attenuation when said shutter is in the path of said optical beam;
   whereby said magnetic field and a magnetic field produced by said current carrying wire interact, thereby causing a movement of said movable shutter.

2. The device as in claim 1, wherein said variable optical attenuator is positioned to attenuate the input optical beam incident to said reflective surface, and wherein the detector output indicates a power level of the output optical beam.

3. The device as in claim 1, wherein said variable optical attenuator attenuates light by reflecting light.

4. The device as in claim 1, further comprising a housing to hold said optical detector, said reflector, said variable optical attenuator, said input and said output fibers as an integrated package.

5. The device as in claim 4, said housing has a first end to hold said optical detector and said reflector, and a second, opposing end to hold said input and said output fibers.

6. A device, comprising:
   a housing having a first end and a second opposing end;
   an optical detector engaged to said first end;
   a stationary collimator lens having a flat end lens facet in said housing to face said optical detector and to transmit a fraction of light to said optical detector;
   a magnet in said housing to produce a magnetic field;
   a capillary body being in said housing to hold input and output fibers that exit said housing at said second opposing end and having an end facet facing said collimator lens to expose end facets of said input and output fibers to said collimator lens and to the magnetic field, wherein said collimator is configured and spaced from said end facet of said capillary body to collimate light from one fiber and to focus reflected light by said flat end lens facet to another fiber;

a conductive wire movably fixed to said capillary body to have a wire portion across said end facet of said capillary body, said wire movable along said end facet when an electric current is supplied to said wire to interact with said magnetic field; and a shutter engaged to said wire portion and movable along with said wire to intercept a beam that is either output by said input fiber or received by said output fiber to attenuate the beam.

7. The device as in claim 6, wherein said shutter reflects the beam when intercepting the beam.

8. The device as in claim 6, further comprising first and second adhesive pads on sides surfaces of said capillary body to bond two parts of said wire to said capillary body as pivot points for motion of said wire.

9. The device as in claim 8, wherein said adhesive pads are elastic and soft to reduce effects of mechanical shocks and vibrations to said wire and said shutter.

10. The device as in claim 9, wherein said adhesive pads are made of an epoxy.

11. The device as in claim 6, further comprising a control unit the controls the electric current in said wire in response to an output of said optical detector.

12. The device as in claim 6, wherein said collimator lens is a GRIN lens.

13. The device as in claim 6, wherein said flat end lens facet is coated with a reflective coating that is partially transmissive.

* * * * *

UNITED STATES PATENT AND TRADEMARK OFFICE
CERTIFICATE OF CORRECTION

| | | |
|---|---|---|
| PATENT NO. | : 7,346,240 B1 | Page 1 of 1 |
| APPLICATION NO. | : 10/726026 | |
| DATED | : March 18, 2008 | |
| INVENTOR(S) | : Yi He and Jian Li | |

It is certified that error appears in the above-identified patent and that said Letters Patent is hereby corrected as shown below:

Column 3, line 45 "the VOA 103 does" should be changed to --the VOA 130 does--

Column 6, line 66 "of the GRN lens" should be changed to --of the GRIN lens--

Signed and Sealed this

Eighth Day of September, 2009

David J. Kappos
*Director of the United States Patent and Trademark Office*